United States Patent
Nakada

(10) Patent No.: US 7,489,357 B2
(45) Date of Patent: Feb. 10, 2009

(54) SOLID-STATE IMAGE PICKUP ELEMENT HAVING IMPROVED RESOLUTION AND SIGNAL TO NOISE RATIO AND SOLID-STATE IMAGE PICKUP APPARATUS USING THE SAME

(75) Inventor: Akira Nakada, Chino (JP)

(73) Assignee: Seiko Epson Corporation (JP)

( * ) Notice: Subject to any disclaimer, the term of this patent is extended or adjusted under 35 U.S.C. 154(b) by 1040 days.

(21) Appl. No.: 10/395,814

(22) Filed: Mar. 24, 2003

(65) Prior Publication Data

US 2003/0234884 A1 Dec. 25, 2003

(30) Foreign Application Priority Data

Mar. 25, 2002 (JP) ............................. 2002-084348

(51) Int. Cl.
H04N 3/14 (2006.01)
H04N 5/335 (2006.01)
(52) U.S. Cl. ..................... 348/321; 348/323; 348/301
(58) Field of Classification Search ................ 348/312, 348/308, 321, 323, 283, 303, 301
See application file for complete search history.

(56) References Cited

U.S. PATENT DOCUMENTS

| | | | | |
|---|---|---|---|---|
| 4,603,354 A | * | 7/1986 | Hashimoto et al. | 348/220.1 |
| 4,814,865 A | * | 3/1989 | Tabei et al. | 348/280 |
| 4,821,088 A | * | 4/1989 | Tabei et al. | 348/280 |
| 4,924,316 A | * | 5/1990 | Kobayashi et al. | 348/222.1 |
| 4,985,758 A | * | 1/1991 | Hashimoto | 348/283 |
| 5,194,944 A | * | 3/1993 | Uchiyama et al. | 348/223.1 |
| 6,011,583 A | * | 1/2000 | Hieda et al. | 348/220.1 |
| 6,466,265 B1 | * | 10/2002 | Lee et al. | 348/308 |

(Continued)

FOREIGN PATENT DOCUMENTS

JP 09-093492 4/1997

(Continued)

OTHER PUBLICATIONS

Communication from Japanese Patent Office regarding counterpart application.

Primary Examiner—Lin Ye
Assistant Examiner—Kelly Jerabek
(74) Attorney, Agent, or Firm—Harness, Dickey & Pierce, P.L.C.

(57) ABSTRACT

Row driving circuits drive a plurality of kinds of pixels in each scanning line. Column reading circuits read from the plurality of kinds of pixels in each column. A column selection circuit for GR colors selects outputs of the column reading circuits in even numbered columns, and a column selection circuit for GB colors selects outputs of the column reading circuits in odd numbered columns. In this way, in a predetermined line, only G signals are output from the column selection circuit for GR colors, and only B signals are output from the column selection circuit for GB colors. Similarly, in the next line, only R signals and only G signals are output from the selection circuits. By amplifying outputs of the column selection circuits with independent amplifications, pixel color based amplifications are possible. Amplifications can be changed in each line, and therefore the resolutions can be improved and outputs with good S/N ratio can be obtained with low speed devices.

23 Claims, 4 Drawing Sheets

U.S. PATENT DOCUMENTS

| | | | |
|---|---|---|---|
| 6,661,457 B1 * | 12/2003 | Mathur et al. | 348/273 |
| 6,683,706 B1 * | 1/2004 | Keithley | 358/514 |
| 6,784,928 B1 * | 8/2004 | Sakurai et al. | 348/220.1 |
| 7,148,927 B2 * | 12/2006 | Ogura et al. | 348/281 |

FOREIGN PATENT DOCUMENTS

| | | |
|---|---|---|
| JP | 2000-012819 | 1/2000 |
| JP | 2001-197510 | 7/2001 |

* cited by examiner

SOLID-STATE IMAGE PICKUP ELEMENT HAVING IMPROVED RESOLUTION AND SIGNAL TO NOISE RATIO AND SOLID-STATE IMAGE PICKUP APPARATUS USING THE SAME

BACKGROUND OF THE INVENTION

1. Technical Field of the Invention

The present invention relates to solid-state image pickup elements such as color image sensors that have improved resolution and S/N ratio, and solid-state image pickup apparatuses using the same.

2. Conventional Technology

In recent years, a variety of solid-state image pickup apparatuses that use solid-state image pickup elements such as image sensors to obtain moving pictures or still-frame pictures have been developed. A color image sensor includes pixels that are composed of photodiodes and transistors, and the pixels are two-dimensionally arranged in an array to obtain two-dimensional images.

Pixel signals obtained by the photodiodes of the respective pixels are retrieved through the transistors. In this case, for example, all the pixels in one line are simultaneously selected, and supplied to a column reading circuit in the form of voltages or currents. Further, the pixel signals are sent from the column reading circuit to a column selection circuit, where the pixels are selected one by one and output.

In the color image sensor, pixels that respond to different wavelengths (colors) are alternately disposed, and color components are detected with a plurality of adjacent pixels of different colors. For example, filters of R (red), G (green) and B (blue) colors are appropriately disposed for each of the pixels to realize color imaging.

A so-called "Bayer" arrangement is often used as a pixel arrangement when, for example, a single plate type image pickup system is used. In a Bayer arrangement, green segments are arranged in a checkered pattern, and red and blue segments are alternately disposed in lines sequentially. In other words, although green segments exist at every other pixel in each line, green segments exist at every other pixel only in each odd numbered line, and blue segments exist at every other pixel only in each even numbered line.

Therefore, in this case, in one line, pixels are arranged in green, red, green, red, . . . , and in the next line, pixels are arranged in blue, green, blue, green, . . . There are a variety of other methods as to in what order color pixels are disposed and how colors are selected, but they are similar to one another in that color pixels are alternately disposed.

FIG. 5 is a block diagram of a conventional solid-state image pickup apparatus that uses the image sensor described above.

An image sensor 1 sequentially outputs analog pixel signals. An amplifier circuit 2 adjusts clamp levels according to optical black, and amplifies input pixel signals to output levels that are within a specified range. Outputs of the amplifier circuit 2 are converted into digital signals by an ADC (analog-to-digital converter) 3, and then supplied to a signal processing circuit not shown.

In this manner, pixels in each line are output one by one from the image sensor. Therefore, for example, when a Bayer arrangement is adopted, green pixels and red pixels are alternately output in one line, and green pixels and blue pixels are alternately output in the next line.

However, the transmittance of green filters is different from the transmittance of red filters or blue filters, and output levels of the solid-state image pickup element are higher in green pixels than in red or blue pixels. If the gain of the amplifier circuit is set according to green pixels, the output levels of the amplifier circuit for red pixels and blue pixels become relatively small, and thus the dynamic range of the ADC is not fully utilized, and their resolutions lower.

It is possible that the amplification of the amplifier circuit is changed for each of the colors; but in this case, the amplification needs to be changed for each of the pixels, which requires an extremely fast control and therefore is not practical.

The present invention is made in view of the problems described above, and one object is to provide a solid-state image pickup element that can set optimum amplifications for outputs from a sensor according to colors to thereby improve its resolution and S/N ratio, and a solid-state image pickup apparatus using the same.

SUMMARY

A solid-state image pickup element in accordance with the present invention comprises: a plurality of pixel types composed of a plurality of photoelectric converter elements that are arranged at intersections of a plurality of scanning lines and a plurality of data lines in a two-dimensional array and respectively respond in a plurality of colors; row driving means connected to the plurality of scanning lines and driving the plurality of pixel types in each of the scanning lines; column reading means connected to the plurality of data lines and reading pixel signals from the plurality of pixel types in each column; first selection means selecting pixel signals from outputs of the column reading means according to the pixel type and sequentially outputting the same; and second selection means selecting pixel signals which the first selection means does not select from the outputs of the column reading means and sequentially outputting the same.

According to such a structure, a plurality of kinds of pixels that respond in a plurality of colors respectively are arranged at intersections of a plurality of scanning lines and a plurality of data lines in a two-dimensional array. The row driving means drives the plurality of kinds of pixels in each of the scanning lines. The column reading means reads out pixel signals from the plurality of kinds of pixels in each column. The first selection means selects pixel signals from outputs of the column reading means according to the kinds of the pixels and sequentially outputs the same, and the second selection means selects pixel signals which the first selection means does not select from the outputs of the column reading means and sequentially outputs the same. In this way, pixel signals that are read out by the column reading means from pixels in each line connected to the scanning lines are output by two systems of the selection means according to their type, and therefore can be read out with optimum settings that are different for each kind. Also, the processing speed at the time of reading can be reduced to, for example, ½ for each of the systems, and therefore outputs with a good S/N ratio can be obtained by a low-speed apparatus.

The plurality of pixel types may include first through third pixels, wherein the first and second pixels are alternately arranged in a specified line, and the first and third pixels are alternately arranged in the next line. In this case, the first selection means selects pixel signals in odd numbered columns, and the second selection means selects pixel signals in even numbered columns.

According to this structure, the first and second pixels are alternately arranged in a specified line, and therefore when pixels in odd numbered columns that are selected by the first selection means are, for example, the first pixels, pixels in even numbered columns that are selected by the second selection means are the second pixels. Also, the first and third pixels are alternately arranged in a line next to the specified line, and therefore when pixels in odd numbered columns that are selected by the first selection means are, for example, the third pixels, pixels in even numbered columns that are selected by the second selection means are the first pixels. In this case, at the time of outputting from a specified line, the first selection means outputs first pixel signals, and the second selection means outputs second pixel signals. In this way, the first pixels selected by the first selection means and the second pixels selected by the second selection means can be read with independent optimum settings that may be different from each other. Also, at the time of outputting from the next line, the first selection means outputs third pixel signals, and the second selection means outputs first pixel signals. In this case also, the third pixels selected by the first selection means and the first pixels selected by the second selection means can be read with independent optimum settings that may be different from each other.

The first through third pixels may respond to green color, red color and blue color, respectively, and the first through third pixels may be arranged in a delta configuration.

According to this structure, for example, in a predetermined line, the first selection means and the second selection means read from green pixels and red pixels, respectively; and in a line next to the predetermined line, the first selection means and the second selection means read from blue pixels and green pixels, respectively. In the predetermined line, reading from the green pixels and red pixels can be conducted at independent respective optimum settings; and in the line next to the predetermined line, reading from the blue pixels and green pixels can be conducted at independent respective optimum settings.

The setting for the outputs from the first selection means and the outputs from the second selection means can be switched at each line, which gives good time margins.

A solid-state image pickup apparatus in accordance with the present invention may also comprise the solid-state image pickup element described above, first amplifier means that amplifies outputs of the first selection means with amplifications according to pixel type, second amplifier means that amplifies outputs of the second selection means with amplifications according to pixel type, and first switching means that switches and selects outputs of the first and second amplifier means and outputs the same in the order of pixels.

According to this structure, pixel signals read from pixels on each line that is connected to a scanning line are output by the two systems of first and second selection means according to pixel type. Outputs of the first selection means are amplified by the first amplifier means with an amplification according to the kind of pixel signals to be output. Also, outputs of the second selection means are amplified by the second amplifier means with an amplification according to the kind of pixel signals to be output. Accordingly, pixel signals can be output at generally equal levels without regard to pixel type. Outputs of the first and second amplifier means are output by the first switching means according to the order of pixels. Also, when outputs of the first switching means are converted into digital signals, the outputs can be processed in the same dynamic range without regard to pixel types because their levels are generally equal to one another, and thus a high resolution can be obtained.

The invention also contemplates that the first and second amplifier means switch amplifications in each line.

According to this structure, even when outputs of the first and second selection means are pixel signals that are different at each line, the outputs can be amplified by the first and second amplifier means with amplifications that are appropriate for the respective types of pixels.

A solid-state image pickup apparatus in accordance with the present invention may also comprise: the solid-state image pickup element described above; first amplifier means that amplifies outputs of the first selection means with amplifications according to pixel type, second amplifier means that amplifies outputs of the second selection means with amplifications according to pixel type; first analog/digital converter means that converts outputs of the first amplifier means into digital signals; and second analog/digital converter means that converts outputs of the second amplifier means into digital signals.

According to this structure, outputs of the first and second amplifier means are converted into digital signals by the first and second analog/digital converter means, respectively. Since the analog/digital conversion is performed in two systems, low-speed converter means can be used as the first and second analog/digital converter means, and the S/N ratio can be improved.

Also, a solid-state image pickup apparatus in accordance with the present invention may further comprise: second switching means that switches outputs of the first selection means according to pixel type and provides the same to the first amplifier means or the second amplifier means; and third switching means that switches outputs of the second selection means according to pixel type and provides the same to the first amplifier means or the second amplifier means.

According to this structure, outputs of the first and second selection means are supplied to the first and second amplifier means by the second and third switching means, respectively, according to pixel type. In this way, for example, only pixel signals of the same kind can be supplied to the first and second amplifier means, which enables a stable amplification without variations.

DETAILED DESCRIPTION

Figure 1:
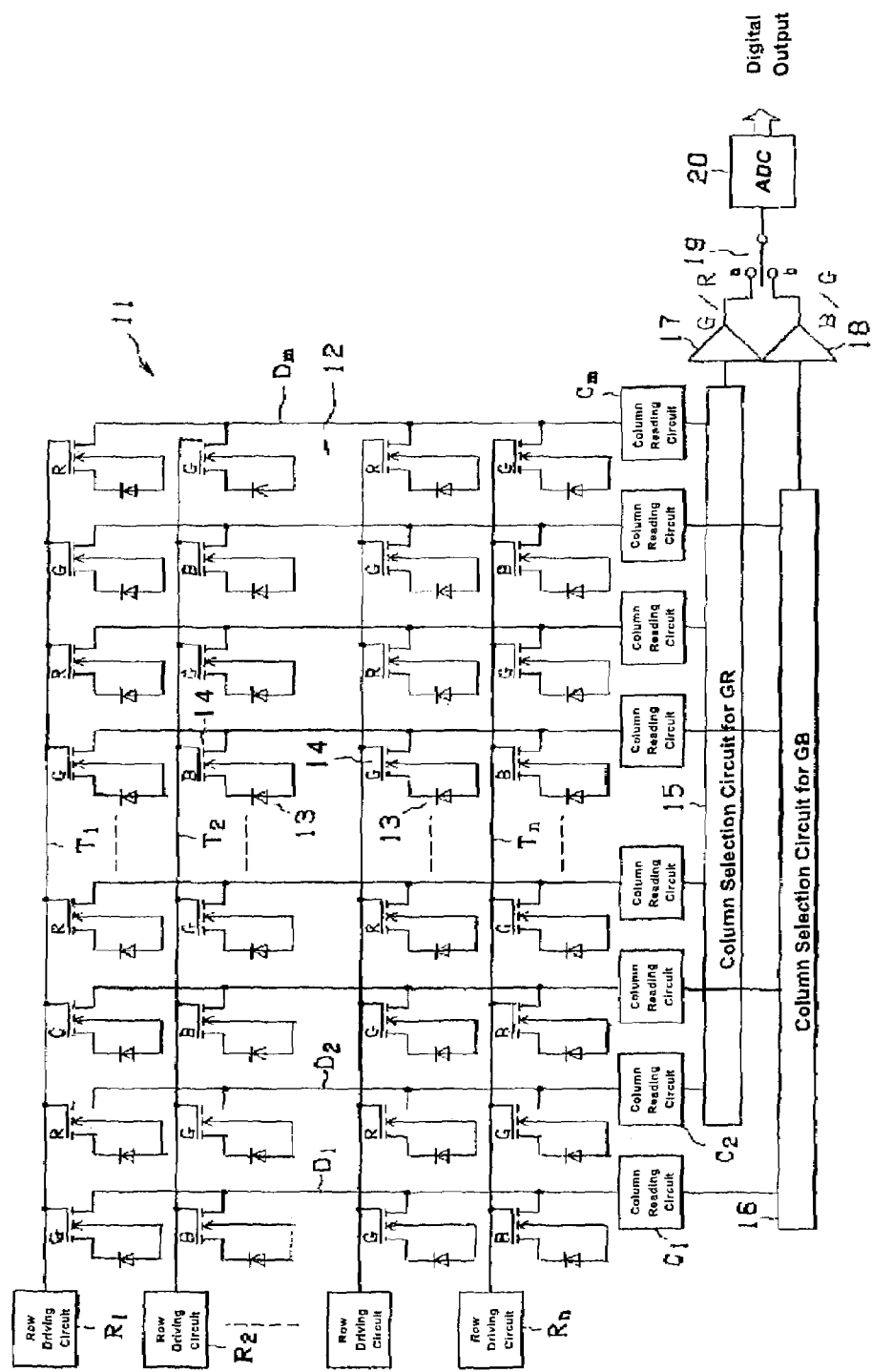
FIG. 1 shows a circuit diagram of a solid-state image pickup apparatus in accordance with a first embodiment of the present invention.

Embodiments of the present invention will be described below in detail with reference to the accompanying drawings. FIG. 1 shows a circuit diagram of a solid-state image pickup apparatus in accordance with a first embodiment of the present invention.

In accordance with the present embodiment, pixel outputs for one line of an image sensor are retrieved by two systems of output circuits, and amplified by two systems of amplifier circuits, such that an amplification can be set for each of the colors.

Referring to FIG. 1, an image sensor 11 includes a pixel region 12 that is composed of a plurality of pixels disposed in a matrix configuration. In the pixel region 12, a plurality of scanning lines T1-Tn (hereafter represented by scanning lines T) and a plurality of data lines D1-Dm (Display memory) (hereafter represented by data lines D) are disposed intersecting one another. Pixels, each of which is composed of a photodiode 13 and a MOS transistor 14, are disposed at intersections of the plural scanning lines T and the plural data lines D.

Gates of the plural transistors 14 disposed along each line are commonly connected to each of the scanning lines T, and sources of the plural transistors 14 disposed along each column are commonly connected to each of the data lines D. The scanning lines T1-Tn are connected to row driving circuits R1-Rn (hereafter represented by row driver circuits R), respectively, and the data lines D1-Dm are connected to column reading circuits C1-Cm (hereafter represented by column reading circuits C), respectively.

The row driving circuits R sequentially supply on-signals to the corresponding scanning lines T. In this way, all of the transistors 14 that are connected to the same scanning line T are simultaneously turned on, and the lines that are turned on are sequentially switched in a predetermined cycle. Also, the column reading circuits C retrieve photoelectric conversion outputs (pixel signals) provided by the photodiodes 13 through the transistors 14 that are turned on.

Each of the pixels may be laminated with, for example, a color filter (not shown), such that it is responsive to light of a different wavelength (color). For example, a Bayer arrangement may be employed in the pixel region 12. R, G and B in FIG. 1 indicate colors to which the respective pixels respond. In the example shown in FIG. 1, G (green) pixels are disposed in a checkered configuration, and R (red) and B (blue) pixels are alternately disposed in lines. Each adjacent up, down, right and left pixels include two G pixels, one R pixel and one B pixel. In other words, an R pixel, a G pixel and a B pixel are arranged in a delta configuration.

In accordance with the present embodiment, outputs of the column reading circuits C are supplied to two systems of column selection circuits 15 and 16. More specifically, the column reading circuits C1, C3, . . . that are connected to the data lines D1, D3, . . . in odd numbered columns output pixel signals to the column selection circuit 16 for GB colors, and the column reading circuits C2, C4, . . . that are connected to the data lines D2, D4, . . . in even numbered columns output pixel signals to the column selection circuit 15 for GR colors.

The column selection circuit 15 for GR colors sequentially output pixel signals from the column reading circuits C2, C4, . . . to an amplifier circuit 17. Also, similarly, the column selection circuit 16 for GB colors sequentially output pixel signals from the column reading circuits C1, C3, . . . to an amplifier circuit 18. In other words, the column selection circuit 15 for GR colors outputs only R signals as pixel signals in odd numbered rows, and only G signals as pixel signals in even numbered rows. Also, the column selection circuit 16 for GB colors outputs only G signals as pixel signals in odd numbered rows, and only B signals as pixel signals in even numbered rows.

The amplifier circuit 17 adjusts clamp levels for pixel signals from the column selection circuit 15 for GR colors according to optical blacks, amplifies the signals to adjust their output levels, and outputs the same to a terminal a of a switch 19. Also, the amplifier circuit 18 adjusts clamp levels for pixel signals from the column selection circuit 16 for GB colors according to optical blacks, amplifies the signals to adjust their output levels, and outputs the same to a terminal b of the switch 19. Amplifications of the amplifier circuits 17 and 18 are controlled by a control circuit that is not shown. Amplifications at the amplifier circuits 17 and 18 are controlled such that the output levels are generally constant in each screen.

Furthermore, in accordance with the present embodiment, the amplifier circuits 17 and 18 are controlled by the control circuit to set different amplifications in each row depending on whether the input pixel signals are G signals, or R or B signals. For example, in the pixel arrangement in FIG. 1, the amplifier circuit 17 sets a relatively high amplification according to the level of R signals during a period in which the column selection circuit 15 for GR colors are outputting pixel signals in odd numbered rows (R signals), and sets a relatively low amplification according to the level of G signals during a period in which the column selection circuit 15 for GR colors are outputting pixel signals in even numbered rows (G signals). Similarly, the amplifier circuit 18 sets a relatively low amplification according to the level of G signals during a period in which the column selection circuit 16 for GB colors are outputting pixel signals in odd numbered rows (G signals), and sets a relatively high amplification according to the level of B signals during a period in which the column selection circuit 16 for GB colors are outputting pixel signals in even numbered rows (B signals).

The switch 19 switches the terminals a and b and selects one of them in a predetermined cycle, and retrieves pixel signals from the amplifier circuits 17 and 18 in the order of the pixels and outputs the same to an ADC 20. The ADC 20 converts input pixel signals into digital signals in a predetermined bit number, and outputs the same to a control circuit (not shown) that performs signal processing and the like.

Next, operations of the present embodiment thus composed will be described.

As an optical image from the subject (not shown) enters the pixels in the pixel region 12, electrical signals depending on the amount of incident light are generated by the photodiodes 13. The row driving circuits R1-Rn supply on-signals to the scanning lines T1-Tn, sequentially from the first line. In this way, the transistors 14 that are connected to each line are sequentially turned on in each line.

Now, let us assume that all of the transistors 14 in the first line are turned on. Then, pixel signals of the pixels in the first line are read out by the column reading circuits C1-Cm. In other words, the column reading circuits C1, C3, . . . in the odd numbered columns read out G signals in the odd numbered columns in the first line, and the column reading circuits C2, C4, . . . in the even numbered columns read out R signals in the even numbered columns in the first line.

The column selection circuit 16 for GB colors is provided with the G signals from the column reading circuits C1, C3, . . . in the odd numbered columns, and sequentially outputs the same to the amplifier circuit 18 in the order of the pixels. Also, the column selection circuit 15 for GR colors is provided with the R signals from the column reading circuits C2, C4, . . . in the even numbered columns, and sequentially outputs the same to the amplifier circuit 17 in the order of the pixels. Each of the column selection circuit 15 for GR colors and the column selection circuit 16 for GB colors outputs pixel signals every other column, and operates at a transfer rate that is half the transfer rate of a one-system output circuit.

During a period of reading out pixels in the first line, only R signals from the column selection circuit 15 for GR colors are input in the amplifier circuit 18, and only G signals from the column selection circuit 16 for GB colors are input in the amplifier circuit 18. In this case, the amplifier circuit 17 is set at a relatively high amplification according to the level of R signals, and the amplifier circuit 18 is set at a relatively low amplification according to the level of G signals.

The amplifier circuit 17 amplifies the R signals that are sequentially input, the same to the terminal a of the switch 19; and the amplifier circuit 18 amplifies the G signals that are sequentially input, outputs the same to the terminal b of the switch 19. The switch 19 performs switching in each pixel, and alternately provides outputs (G signals) of the amplifier circuit 18 and outputs (R signals) of the amplifier circuit 17. In this manner, the switch 19 sequentially outputs the pixel signals in the first line to the ADC 20.

The ADC 20 converts the input pixel signals into digital signals. In this case, the amplifications of the amplifier circuits 17 and 18 are different from each other, and the output levels of the amplifier circuits 17 and 18 are generally at the same level without regard to the G signals or R signals, such that the ADC 20 can perform analog/digital conversions that use generally the entire range of the dynamic range.

Next, let us assume that the scanning line T2 in the second line is turned on. In this way, all of the transistors 14 in the second line are turned on, and, pixel signals of the pixels in the second line are read out by the column reading circuits C1-Cm. In other words, the column reading circuits C1, C3, ... in the odd numbered columns read out B signals in the odd numbered columns in the second line, and the column reading circuits C2, C4, ... in the even numbered columns read out G signals in the even numbered columns in the second line.

The column selection circuit 16 for GB colors is provided with the B signals from the column reading circuits C1, C3, ... in the odd numbered columns, and sequentially outputs the same to the amplifier circuit 18 in the order of the pixels. Also, the column selection circuit 15 for GR colors is provided with the G signals from the column reading circuits C2, C4, ... in the even numbered columns, and sequentially outputs the same to the amplifier circuit 17 in the order of pixels. In this case also, each of the column selection circuit 15 for GR colors and the column selection circuit 16 for GB colors operates at a transfer rate that is half the transfer rate of a one-system output circuit.

During a period of reading out pixels in the second line, only G signals from the column selection circuit 15 for GR colors are input in the amplifier circuit 17, and only B signals from the column selection circuit 16 for GB colors are input in the amplifier circuit 18. In this case, the amplifier circuit 17 is set at a relatively low amplification according to the level of G signals, and the amplifier circuit 18 is set at a relatively high amplification according to the level of B signals.

The amplifications of the amplifier circuits 17 and 18 are switched in each line. In other words, the amplifier circuits 17 and 18 have good time margins for switching their amplifications.

The amplifier circuit 17 amplifies the G signals that are sequentially input, and outputs the same to the terminal a of the switch 19; and the amplifier circuit 18 amplifies the B signals that are sequentially input, and outputs the same to the terminal b of the switch 19. The switch 19 performs switching in each pixel, and alternately provides outputs (G signals) of the amplifier circuit 17 and outputs (B signals) of the amplifier circuit 18. In this manner, the switch 19 sequentially outputs the pixel signals in the second line to the ADC 20.

The ADC 20 converts the input pixel signals into digital signals. In this case, the amplifications of the amplifier circuits 17 and 18 are different from each other, and the output levels of the amplifier circuits 17 and 18 are generally at the same level without regard to the G signals or B signals, such that the ADC 20 can perform analog/digital conversions that use generally the entire range of the dynamic range.

Then, similar operations are repeated, all the pixels in the pixel region 12 are read out.

In this manner, in accordance with the present embodiment, the output circuit of the image sensor is divided into two systems, and each of the systems outputs pixel signals in the same color in each one line period. Then, the two systems of amplifier circuits switch their amplifications depending on G signals, or R or B signals such that the output levels of R, G and B signals are generally equal to one another, and thus the dynamic range at the ADC 20 can be effectively used. In this way, the resolution of each of the R, G and B signals can be improved. Also, since R and B signals can be amplified to a sufficient level, good S/N ratios can be obtained. Furthermore, since the two systems of column selection circuits and amplifier circuits are used, the processing speed at each of the column selection circuits and each of the amplifier circuits can be reduced in half, which can give good processing margins, and improve S/N ratios.

Figure 2:
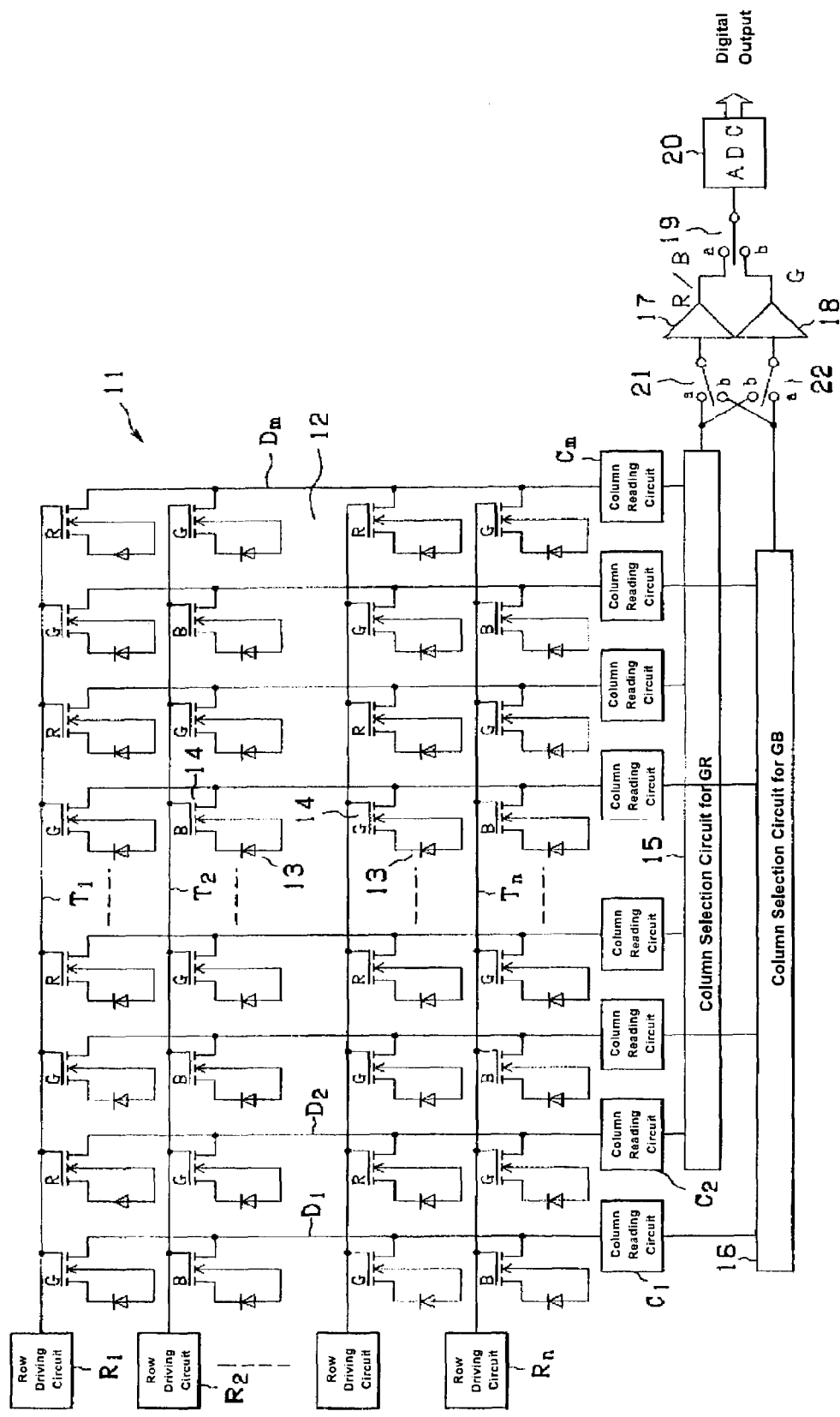
FIG. 2 shows a circuit diagram of a second embodiment of the present invention.

FIG. 2 shows a circuit diagram of a second embodiment of the present invention. Components in FIG. 2 that are the same as those in FIG. 1 are assigned the same reference numerals, and their description is omitted.

In the first embodiment, the amplifications of two systems of amplifier circuits are changed in each row to make the output levels of R, G and B signals generally equal to one another. In contrast, in accordance with the present embodiment, only G signals can be output from one of the output systems during the entire period. Also, using the fact that output levels of R and B signals can be made equal to each other by generally the same amplifications, amplifications of the two systems of amplifier circuits are made generally constant.

The present embodiment is different from the first embodiment shown in FIG. 1 in that switches 21 and 22 are added. Output terminals of a column selection circuit 15 for GR colors are connected to a terminal a of a switch 21 and a terminal b of a switch 22. Also, output terminals of a column selection circuit 16 for GB colors are connected to a terminal b of the switch 21 and a terminal a of the switch 22. The switches 21 and 22 are coupled, and switch and select the terminals a and b in each row.

More specifically, the switch 21 outputs pixel signals that are input through the terminal a to the amplifier circuit 17 at the time of reading odd numbered lines, and outputs pixel signals that are input through the terminal b to the amplifier circuit 17 at the time of reading even numbered lines. Also, the switch 22 outputs pixel signals that are input through the terminal a to the amplifier circuit 18 at the time of reading odd numbered lines, and outputs pixel signals that are input through the terminal b to the amplifier circuit 18 at the time of reading even numbered lines.

Next, operations of the present embodiment thus composed will be described.

Outputs from the column selection circuit 15 for GR colors and the selector circuit 16 for GB colors are the same as those of the first embodiment. Now, let us assume that pixels in the first line are read out. In this case, the column selection circuit 16 for GB colors is provided with the G signals from the column reading circuits C1, C3, ... in the odd numbered columns, and sequentially outputs the same in the order of the pixels. Also, the column selection circuit 15 for GR colors is provided with the R signals from the column reading circuits C2, C4, ... in the even numbered columns, and sequentially outputs the same in the order of the pixels. In the present embodiment also, each of the column selection circuit 15 for GR colors and the column selection circuit 16 for GB colors outputs pixel signals every other column, and operates at a transfer rate that is half the transfer rate of a one-system output circuit.

At the time of reading from the first line, only G signals in the odd numbered columns are output from the column selection circuit 16 for GB colors, and only R signals in the even numbered columns are output from the column selection circuit 15 for GR colors.

At the time of reading from the first line, the switches 21 and 22 select the terminals a. In other words, in this case, R signals from the column selection circuit 15 for GR colors are supplied through the switch 21 to the amplifier circuit 17, and G signals from the column selection circuit 16 for GB colors are supplied through the switch 22 to the amplifier circuit 18. The amplifier circuit 17 is set at a relatively high amplification according to the level of R signals, and the amplifier circuit 18 is set at a relative low amplification according to the level of G signals.

The amplifier circuit 17 amplifies the R signals that are sequentially input, output, the same to the terminal a of the switch 19; and the amplifier circuit 18 amplifies the G signals that are sequentially input, outputs the same to the terminal b of the switch 19. The switch 19 performs switching in each pixel, and alternately provides outputs (G signals) of the amplifier circuit 18 and outputs (R signals) of the amplifier circuit 17. In this manner, the switch 19 sequentially outputs the pixel signals in the first line to the ADC 20.

Next, let us assume that reading from the second line is conducted. In this case, the column selection circuit 16 for GB colors is provided with B signals in the odd numbered columns, and sequentially outputs the same in the order of pixels. Also, the column selection circuit 15 for GR colors is provided with G signals in the even numbered columns, and sequentially outputs the same in the order of pixels.

At the time of reading from the second line, the switches 21 and 22 select the terminals b. In other words, in this case, B signals from the column selection circuit 16 for GB colors are supplied through the switch 21 to the amplifier circuit 17, and G signals from the column selection circuit 15 for GR colors are supplied through the switch 22 to the amplifier circuit 18. The amplifier circuit 17 is set at a relatively high amplification according to the level of B signals, and the amplifier circuit 18 is set at a relative low amplification according to the level of G signals.

The amplifier circuit 17 amplifies the B signals that are sequentially input, and outputs the same to the terminal a of the switch 19; and the amplifier circuit 18 amplifies the G signals that are sequentially input, and outputs the same to the terminal b of the switch 19. The switch 19 performs switching in each pixel, and alternately provides outputs (B signals) of the amplifier circuit 17 and outputs (G signals) of the amplifier circuit 18. In this manner, the switch 19 sequentially outputs the pixel signals in the second line to the ADC 20.

Other actions are the same as those of the first embodiment.

In accordance with the present embodiment, outputs of R, G and B signals at generally equal levels can be input in the ADC, and therefore effects similar to those of the first embodiment can be obtained. Furthermore, in the present embodiment, at the time of reading from any of the lines, only R signals or B signals are provided to the amplifier circuit 17, and only G signals are provided to the amplifier circuit 18. The amplifier circuit 18 can always perform amplifications at a constant amplification, and therefore can run consistently (avoid variations in its characteristic). Also, the amplifier circuit 17 can use an amplification for R signals that is generally the same as an amplification for B signals, and therefore can run consistently (avoid variations in its characteristic).

Figure 3:
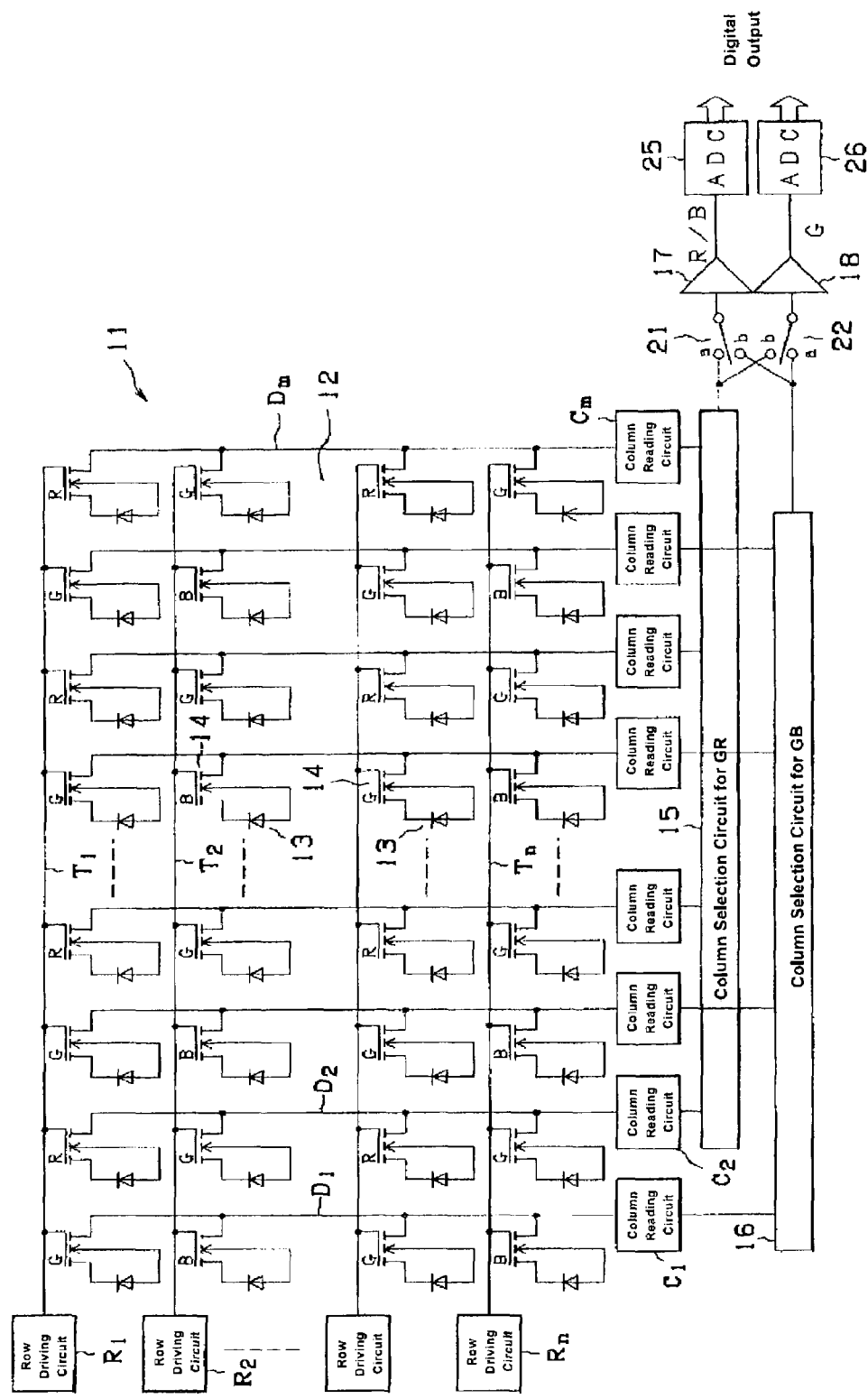
FIG. 3 shows a circuit diagram of a third embodiment of the present invention.

FIG. 3 shows a circuit diagram of a third embodiment of the present invention. Components in FIG. 3 that are the same as those in FIG. 2 are assigned the same reference numerals, and their description is omitted.

In the second embodiment, amplifications of the two systems of amplifier circuits can be made generally constant. Further in accordance with the present embodiment, two systems of ADCs are provided such that the operation speed of the ADCs can be lowered.

The present embodiment does not convert pixel signals in two systems into one system by a switch 19 to be given to an ADC, but gives pixel signals in two systems without any conversion to two ADCs 25 and 26 in two systems. Each of the ADCs 25 and 26 perform an analog-to-digital conversion on the input pixel signals and provides digital outputs.

In the present embodiment thus composed, R signals or B signals are output from the amplifier circuit 17, and only G signals are output from the amplifier circuit 18, like the second embodiment. The outputs from the amplifier circuits 17 and 18 are supplied to the ADCs 25 and 26, respectively. The ADC 25 converts R signals or B signals provided from the amplifier circuit 17 into digital signals and outputs the same. Also, the ADC 26 converts G signals provided from the amplifier circuit 18 into digital signals and outputs the same.

The amplifier circuit 17 outputs m/2 R signals for each line. Also, as for B signals, m/2 analog outputs for each line can be obtained. Also, the amplifier circuit 18 outputs m/2 G signals for each line. Accordingly, the number of pixel signals to be processed by each of the ADCs 25 and 26 in each line is ½ of that processed by the ADC 20. Accordingly, the ADCs 25 and 26 can have relatively slow operation speeds. Also, the ADCs 25 and 26 can provide outputs with relatively low noise and good S/N ratio because their operation speeds can be low.

In this manner, in accordance with the present embodiment, not only the column selection circuit 15 for GR colors, the column selection circuit 16 for GB colors and the amplifier circuits 17 and 18, but also the ADCs 25 and 26 can reduce their operation speeds, effects similar to those of the second embodiment can be obtained, and outputs with high S/N ratio that are resistive to noise can be obtained.

It is noted that an example in which the present embodiment is applied to the second embodiment shown in FIG. 2 is described, but it should be appreciated that the present embodiment is also applicable to the first embodiment.

Figure 4:
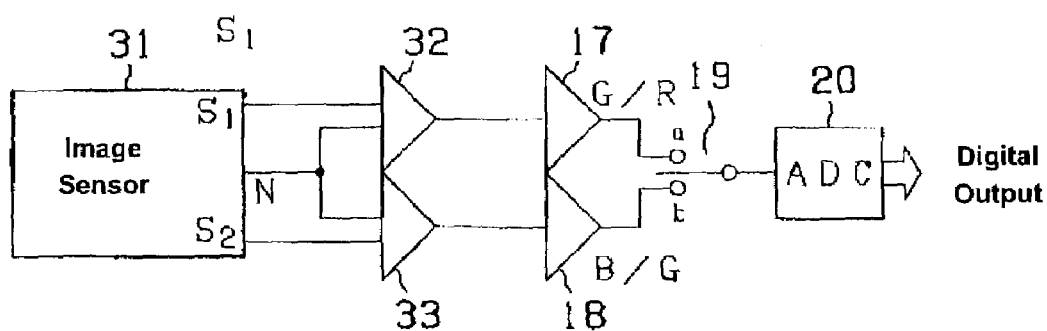
FIG. 4 shows a circuit diagram of a fourth embodiment of the present invention.
Figure 5:
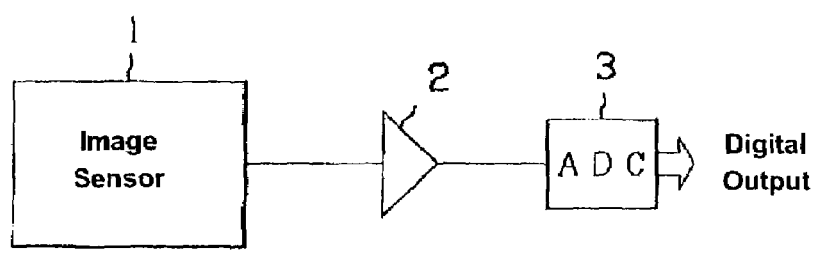
FIG. 5 shows a block diagram of a conventional solid-state image pickup apparatus.

FIG. 4 shows a circuit diagram of a fourth embodiment of the present invention. Components in FIG. 4 that are the same as those in FIG. 1 are assigned the same reference numerals, and their description is omitted.

The present embodiment is an example in which an image sensor outputs noise components N to cancel noises included in its output pixel signals. The present embodiment is different from the first embodiment in that an image sensor 31 is implemented instead of the image sensor 11, and amplifier circuits 32 and 33 for canceling noises are added.

The image sensor 31 is equipped with two systems of output circuits (not shown) like the one in FIG. 1. One of the output circuits outputs signals S1 that include G signals and R signals, and the other of the output circuits outputs signals S2 that include B signals and G signals. Further, it also outputs noise components N to cancel noises included in the signals S1 and S2.

The amplifier circuit 32 outputs differences between the signals S1 and the noise components N to the amplifier circuit 17. Also, the amplifier circuit 33 outputs differences between the signals S2 and the noise components N to the amplifier circuit 18.

Other actions and compositions are the same as those of the first embodiment.

In accordance with the present embodiment, signals S1 and S2 whose noise components are canceled are output from the amplifier circuits 32 and 33. The signals S1 include G signals and R signals, and the signals S2 include B signals and G signals. These signals S1 and S2 are supplied to the amplifier circuits 17 and 18.

In this manner, in the present embodiment also, effects similar to those of the first embodiment can be obtained.

It should be appreciated that the present embodiment is also applicable to the second and third embodiments.

As described above, the present invention is effective in improving the resolution and S/N ratio through enabling optimum amplifications to be set for the outputs from a sensor according to pixel colors.

The entire disclosure of Japanese Patent Application No. 2002-084348 filed Mar. 5, 2002 is incorporated by reference.

The invention claimed is:

1. A solid-state image pickup element comprising:
    a plurality of pixels including a plurality of photoelectric converter elements arranged at intersections of a plurality of scanning lines and a plurality of data lines in a two-dimensional array including rows and columns, the photoelectric converter elements respectively responding to a plurality of colors;
    row driving means connected to the plurality of scanning lines for driving the plurality of pixels in each of the scanning lines;
    column reading means connected to the plurality of data lines for reading pixel signals from the plurality of pixels in each column;
    first selection means for selecting pixel signals from outputs of the column reading means according to pixel type and sequentially outputting the same;
    second selection means for selecting pixel signals which the first selection means does not select from the outputs of the column reading means and sequentially outputting the same;
    first switching means for receiving outputs of each of the first and second selection means, switching the outputs of the first and second selection means according to pixel type, and selectively providing one of the outputs to at least one of first and second amplifier means; and
    second switching means for receiving the outputs of each of the first and second selection means, switching the outputs of the first and second selection means according to pixel type, and selectively providing one of the outputs to at least one of the first and second amplifier means.

2. A solid-state image pickup element according to claim 1, wherein
    the plurality of pixel types include first through third pixels,
    the first and second pixels are alternately arranged in a specified horizontal line, and the first and third pixels are alternately arranged in an adjacent horizontal line
    the first selection means selects pixel signals in odd numbered columns, and
    the second selection means selects pixel signals in even numbered columns.

3. A solid-state image pickup element according to claim 2, wherein
    the first, second, and third pixels respond to green color, red color and blue color, respectively, and
    the first, second, and third pixels are arranged in a delta configuration.

4. The solid-state image pickup element according to claim 1 wherein:
    the first selection means selects pixel signals corresponding to a first color and a second color and does not select pixel signals corresponding to a third color; and
    the second selection means selects pixel signals corresponding to the first color and the third color and does not select pixel signals corresponding to the second color.

5. The solid-state image pickup element according to claim 4 wherein:
    the first amplifier means receives the pixel signals corresponding to at least one of the first and second colors; and
    the second amplifier means receives the pixel signals corresponding to the first and third colors.

6. The solid-state image pickup element according to claim 4 further comprising analog to digital (A/D) conversion means for converting the pixel signals to digital signals and for including a single input that receives the pixel signals corresponding to the first and third colors.

7. The solid-state image pickup element according to claim 1 further comprising:
    third amplifier means for receiving first signals from the first selection means and a noise component and for outputting a difference between the first signals and the noise component; and
    fourth amplifier means for receiving second signals from the second selection means and the noise component and for outputting a difference between the second signals and the noise component.

8. A solid-state image pickup element according to claim 1, wherein
    the first amplifier means amplifies outputs of the first selection means with amplifications according to pixel type; and
    the second amplifier means amplifies outputs of the second selection means with amplifications according to pixel type.

9. A solid-state image pickup element according to claim 8, further comprising:
    an analog/digital converter means for converting outputs of at least one of the first amplifier means and the second amplifier means into digital signals.

10. A solid-state image pickup apparatus comprising:
    a solid-state image pickup element including:
    a plurality of pixels including a plurality of photoelectric converter elements arranged at intersections of a plurality of scanning lines and a plurality of data lines in a two-dimensional array including rows and columns, the photoelectric converter elements respectively responding to a plurality of colors;
    row driving means connected to the plurality of scanning lines for driving the plurality of pixels in each of the scanning lines;
    column reading means connected to the plurality of data lines for reading pixel signals from the plurality of pixels in each column;
    first selection means for selecting pixel signals from outputs of the column reading means according to pixel type and sequentially outputting the same; and
    second selection means for selecting pixel signals which the first selection means does not select from the outputs of the column reading means and sequentially outputting the same;

first amplifier means for amplifying outputs of the first selection means with amplifications according to pixel type;

second amplifier means for amplifying outputs of the second selection means with amplifications according to pixel type;

first switching means for switching and selecting outputs of the first and second amplifier means and outputting the same in a pixel order;

second switching means for receiving the outputs of each of the first and second selecting means, switching the outputs of the first and second selection means according to pixel type, and selectively providing one of the outputs to at least one of the first amplifier means and the second amplifier means; and third switching means for receiving the outputs of each of the first and second selecting means, switching the outputs of the first and second selection means according to pixel type, and selectively providing one of the outputs to at least one of the first amplifier means and the second amplifier means.

11. A solid-state image pickup apparatus according to claim 10, wherein the first and second amplifier means switch amplifications for each line.

12. A solid-state image pickup element comprising:

a plurality of scanning lines;

a plurality of data lines;

a plurality of pixels positioned corresponding to a plurality of intersections between the plurality of scanning lines and the plurality of data lines, the plurality of pixels including a plurality of photoelectric converter elements;

a row driving section providing a plurality of driving signals to the plurality of scanning lines;

a column reading section reading a plurality of sensing signals from the plurality of data lines;

a first column selection circuit selecting a plurality of first pixel signals from the plurality of sensing signals from the plurality of data lines;

a second column selection circuit selecting a plurality of second pixel signals from the plurality of sensing signals from the plurality of data lines;

a first switching circuit configured to receive a first output from the first column selection circuit and a second output from the second column selection circuit and to switch the first and second outputs;

a second switching circuit configured to receive a first output from the first column selection circuit and a second output from the second column selection circuit and to switch the first and second outputs;

a first amplifier circuit configured to receive one of the first and second outputs from one of the first and second switching circuits; and a second amplifier circuit configured to receive one of the first and second outputs from one of the first and second switching circuits.

13. The solid-state image pick element according to claim 12, the first selection circuit configured to read the plurality of first pixel signals from a first set of the plurality of data lines, the second selection circuit configured to read the plurality of second pixel signals from a second set of the plurality of data lines, the first set of the plurality of data lines being different from the second set of the plurality of data lines.

14. The solid-state image pick element according to claim 13, the first selection circuit configured to read the plurality of first pixel signals from the first set of the plurality of data lines in a first driving period, the second selection circuit configured to read the plurality of second pixel signals from the second set of the plurality of data lines in a second driving period, the first driving period being different from the second driving period.

15. The solid-state image pick element according to claim 12, the first amplifier circuit configured to receive the first output and a noise component and to output a difference between the first output and the noise component.

16. The solid-state image pick element according to claim 12, the plurality of photoelectric converter elements including a plurality of photodiodes and a plurality of transistors.

17. The solid-state image pick element according to claim 12, the plurality of pixels including a plurality of color filters, a first set of the plurality of pixels including a first set of the plurality of color filters corresponding to a first color, the first set of the plurality of pixels including a second set of the plurality of color filters corresponding to a second color, a second set of the plurality of pixels including a third set of the plurality of color filters corresponding to the first color, the second set of the plurality of pixels including a fourth set of the plurality of color filters corresponding to a third color, the first set of the plurality of pixels corresponding to a first set of plurality of scanning lines, the second set of the plurality of pixels corresponding to a second set of plurality of scanning lines.

18. The solid-state image pick element according to claim 12, the row driving section including a plurality of row driving circuits providing the plurality of driving signals to the plurality of scanning lines.

19. The solid-state image pick element according to claim 12, the column reading section including a plurality of column reading circuits reading the plurality of sensing signals from the plurality of data lines.

20. A solid-state image pickup element comprising:

a scanning line;

a first data line;

a second data line;

a first pixel positioned corresponding to an intersection between the scanning line and the first data line, the first pixel including a first photoelectric converter element;

a second pixel positioned corresponding to an intersection between the scanning line and the second data line, the second pixel including a second photoelectric converter element;

a row driving circuit providing a driving signal to the scanning line;

a first column selection circuit selecting a first pixel signal from a first sensing signal which the first data line provides;

a second column selection circuit selecting a second pixel signal from a second sensing signal which the second data line provides;

a first switching circuit configured to receive a first output from the first column selection circuit and a second output from the second column selection circuit and to switch the first and second outputs;

a second switching circuit configured to receive a first output from the first column selection circuit and a second output from the second column selection circuit and to switch the first and second outputs;

a first amplifier circuit configured to receive one of the first and second outputs from one of the first and second switching circuits; and a second amplifier circuit configured to receive one of the first and second outputs from one of the first and second switching circuits.

21. The solid-state image pick element according to claim 20, the first amplifier circuit configured to receive the first output and a noise component and to output a difference between the first output and the noise component.

22. A solid-state image pickup element comprising:
a scanning line;
a first data line;
a second data line;
a first pixel positioned corresponding to an intersection between the scanning line and the first data line, the first pixel including a first photoelectric converter element;
a second pixel positioned corresponding to an intersection between the scanning line and the second data line, the second pixel including a second photoelectric converter element;
a row driving circuit providing a driving signal to the scanning line;
a first column reading circuit reading a first sensing signal from the first data line;
a second column reading circuit reading a second sensing signal from the second data line;
a first column selection circuit receiving a first pixel signal from the first column reading circuit;
a second column selection circuit receiving a second pixel signal from the second column reading circuit;
a first switching circuit configured to receive a first output from the first column selection circuit and a second output from the second column selection circuit and to switch the first and second outputs;
a second switching circuit configured to receive a first output from the first column selection circuit and a second output from the second column selection circuit and to switch the first and second outputs;
a first amplifier circuit configured to receive one of the first and second outputs from one of the first and second switching circuits; and
a second amplifier circuit configured to receive one of the first and second outputs from one of the first and second switching circuits.

23. The solid-state image pick element according to claim 22, the first amplifier circuit configured to receive the first output and a noise component and to output a difference between the first output and the noise component.

* * * * *